Nov. 1, 1955 — E. W. GOLDBERG — 2,722,158
LENS MOUNT FOR PICTURE PROJECTORS
Filed April 27, 1951
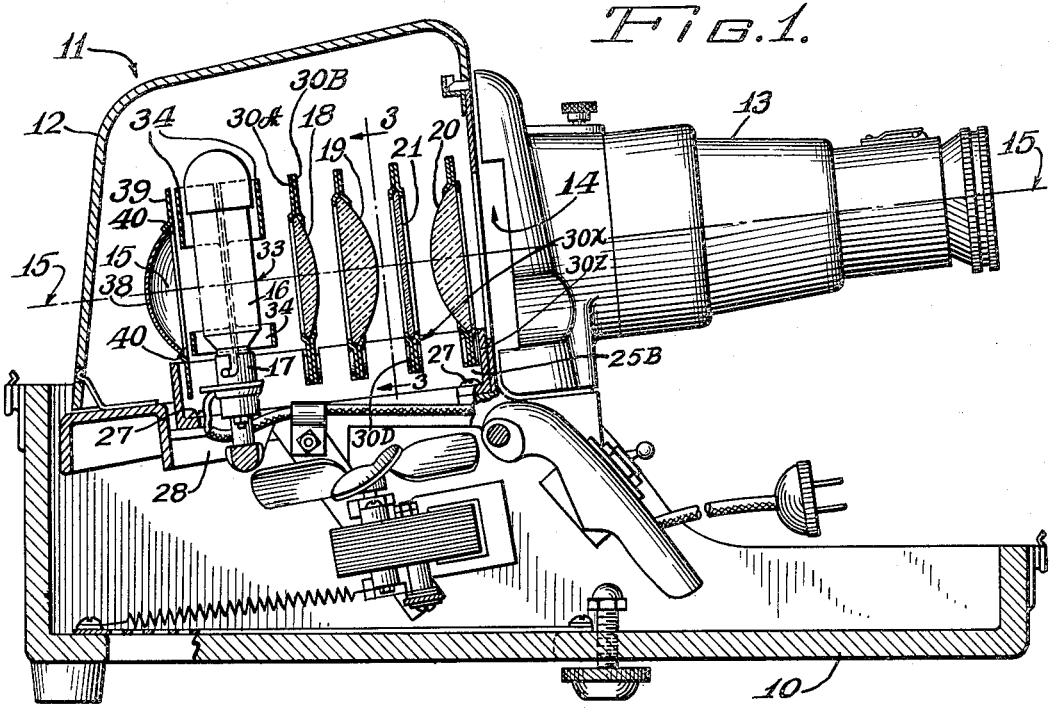
Inventor:
Ernest W. Goldberg

United States Patent Office 2,722,158
Patented Nov. 1, 1955

2,722,158

LENS MOUNT FOR PICTURE PROJECTORS

Ernest W. Goldberg, Wilmette, Ill.

Application April 27, 1951, Serial No. 223,238

10 Claims. (Cl. 88—24)

This invention pertains to light projection apparatus, such as slide and film projectors, and has as its principal object the provision of a novel lens mounting unit characterized principally in that the lenses are mounted in frames which are individually mounted to pivot at one side in a common bed and swing into and out of optical position for purposes of cleaning, replacement, and the like.

Viewed from another aspect, it is an object to provide a lens mounting unit including a bed of a certain construction, a plurality of lens carriers pivotally mounted at one side of the bed to swing on a common axis into and out of aligned position relative to the optical axis, together with a locking or securing arrangement which includes catch or holding formations in an opposite side of the bed and into which portions of the lens carriers are guidedly seated and frictionally held.

Additional objects and aspects of novelty and utility relate to details of the construction and operation of the illustrative embodiment described hereinafter in view of the annexed drawing, in which:

Fig. 1 is a vertical section through a slide projector embodying the invention, parts being shown in elevation;

Fig. 2 is a top plan view of the novel lens mounting unit;

Fig. 3 is a vertical, lateral sectional detail through the lens mounting unit;

Fig. 4 is a cross-section through the lens mounting unit showing the lamp baffle in front elevation;

Fig. 5 is a horizontal sectional fragment, to enlarged scale, showing the lens carrier pivot and catch as viewed along lines 5—5 of Fig. 3;

Referring to Fig. 1, the lens mounting unit is shown in conjunction with a slide projector of known construction and including a base portion 10, a lamp housing 11 having a removable dome or cover 12, a projecting-lens barrel 13, and a slide bed 14 situated across the optical or projection axis 15—15.

Within the lamp housing is a light source in the form of a cylindrical lamp 16 removably seated in socket 17.

The optical system includes, in addition to the usual objective or projecting lenses associated with the barrel 13, a system of collecting and condensing lenses, 18, 19, and 20, and a heat filter 21, all carried by the improved lens mounting means which includes, as shown in Fig. 2, a bed casting consisting of opposite parallel side members or bars 25A and 25B joined at their longitudinal extremities by cross-webs 26.

The bed casting is secured within the lamp housing below the optical axis, as by screws 27, Fig. 1, engaged in parts of the housing base structure 28.

Each of the lens elements of the condensing system is carried in a rounded metal frame 30, of the approximate horseshoe shape depicted in Fig. 3.

Preferably, the lens carriers are each formed of a pair of mating stamped sheet-metal shells, 30A, 30B, shown sectionally in Fig. 1, with the lens element 18 gripped therebetween and the two halves or shells secured together by means of spot-welding, crimping or the like.

In the case of two other parts of this optical system, namely the lamp baffle and the reflector, special frames are employed, the lamp baffle or radiator being shown to advantage in Figs. 2 and 4 and including a pair of mating perforate or cut-out plates 32A and 32B having aligned central openings or windows 33 with adjoining complementary semi-circular offsets 34 of a size to closely encircle the lamp 16. The two half-sections 32A, 32B of the lamp baffle are clinched together by lugs 35 crimped over the edges thereof, the baffle serving as a means of dissipating some of the heat from the lamp 16.

A reflector 38, Figs. 1 and 2, is carried in a frame 39 made from a single sheet-metal stamping and having tangs 40 bent against the reflector body to hold the latter in position.

The lens frames or carriers 30, Fig. 3, each have a straight, horizontal bottom edge 30C near the opposite extremities of which are apertured protuberances or bosses 30D and 30E, Figs. 3 and 5, stamped into the plates which comprise the carrier frames, and serving as stabilizing and locking means for the frames or carriers.

Oppositely aligned bed slots 30X are formed in the side bars 25A, 25B of the bed, the oppositely situataed slots in the two bars constituting pairs. The bed slots are of a width to afford a snug, wobble-free fit with bosses 30D, 30E, and the carriers being pivotally mounted at one side of the bed by means of a common pintle rod 30Z carried in a bore through the side portion 25B of the bed and passing through all of the hinge or pivot slots 30X in that side thereof.

Thus, in Fig. 3, the carrier 30 is shown in normal operative position, with the locking boss 30E seated home in its bar slot 30X. To render the lens 18 accessible for cleaning, the carrier 30 is grasped and pivoted into the dotted line position, after first removing the lamp housing dome or cover 12, which fits closely about the light system.

It will be observed in Fig. 4 that upon removing (upwardly) the lamp 16, the heat baffle 32A—32B may be pivoted to one side to afford free access to the lamp socket and wiring.

The entire assembly of elements of the light system, including the reflector 38, lamp baffle 32A–B, and all lens or filter elements 18, 19, 20, 21, may be removed, if necessary, by withdrawing the pintle rod 30Z to the left, Fig. 1.

However, in normal operation and use of the projector, it is only rarely necessary to completely remove a lens or filter element so long as these elements are otherwise movable and accessible for cleaning; and one of the advantages of the novel mounting unit resides in the fact that it affords an economical but highly satisfactory means for rendering the lens and filter elements separately movable into positions where they may be cleaned, without complete removal or altering their positions in the assembly, it being a common occurrence in the use of former types of lens mount to find people removing all of the lenses and then returning them to improper positions in the optical assembly, such mistakes being rendered far less likely by the present construction since there is rarely any occasion for removing the pintle rod or the entire set of lens elements.

Moreover, even when the pintle 30Z is removed, the locking bosses tend to maintain the same position, so that a single carrier may be withdrawn without danger of the others being accidentally dislodged.

I claim:

1. A mounting for lens and optical elements comprising a bed including opposite parallel side bars arranged in parallelism with a predetermined optical axis for said lens and optical elements and said bars having aligned pairs of carrier slots formed along the length thereof at predetermined intervals, and carriers for optical elements each having a bottom portion receivable to seat in alignment with said axis in a corresponding pair of said carrier slots and each pivoted in one of the slots of its pair so as to be pivotable into and out of seated position in the remaining slot of said pair.

2. A mounting according to claim 1 in which all of said carriers are pivoted only in a particular one of said bars on a common pintle positioned in a bore passing through all of the carrier slots in said bar.

3. A construction according to claim 1 in which each of said carriers has a holding boss snugly fitting into the said remaining slot of its said pair to yieldingly secure the carrier in seated operative position in the bed as aforesaid.

4. A mounting unit according to claim 3 in which said carriers are provided with a pair of bosses on opposite bottom portions thereof and each respectively fitting in normal operative position of the carrier closely into one of the slots of the corresponding pair of carrier slots to stabilize the pivotal movement of the carrier in that one of said slots in which it pivots, and to yieldingly hold the carrier in said normal seated operative position with the remaining boss in the remaining slot of said pair.

5. Lens mounting means comprising a lens frame constructed of mating metal shells secured together to grip a lens therebetween, said frame having a pair of embossed protuberances at opposite positions near a bottom edge thereof, and means including a pair of elongated horizontal bars having mutually aligned transversely directed pairs of slots therein of a width to admit said protuberances, one of said protuberances on each lens frame being pierced to admit a pintle, and one of said bars having a longitudinal bore passing through all of the slots therealong in alignment with the pierced opening in a frame protuberance disposed therein, and a pintle rod disposed in said bore and serving as a common pintle for all lens frames, the protuberances fitting snugly in said slots to hold said frames firmly in position when fully seated therein.

6. In a lens mount, a pair of parallel bars constituting a frame bed, said bars having transverse mutually aligned slots in pairs, each of said pairs being adopted to seat a lens frame in optical alignment with an axis parallel to said bars, and a plurality of lens frames each having a bottom edge to span said bars and each having near opposite extremities of said edge a boss to fit snugly into a corresponding pair of said slots, each boss seating in one slot of a pair in each bar, and an elongated pintle rod extending lengthwise through one of said bars and all of the slots and frame bosses therein, whereby all of the lens frames are pivotally mounted on one of said bars and rock into operative position and optical alignment with said axis and having their respective remaining bosses seating in a slot in the remaining bar.

7. A lens mount according to claim 6 in which said frames each consist of a pair of mating stampings of approximately horseshoe-shape to include an upper rounded peripheral edge terminating in a straight horizontal bottom edge, with registering central openings for a lens, and registering embossments near said bottom edge, said stampings being secured together with a lens clamped therebetween at the said lens openings, and said embossments being registered so as to project outwardly on opposite sides of the frame, the registered embossments on one side of said frame being pierced to provide passage for said pintle rod.

8. In a lens mount, a bed including opposite parallel flange members, one of which has a bore longitudinally therethrough, and both of which have transverse slots, the slots in one flange member being aligned with those in the other said member, mutually aligned slots in both flange members constituting a pair to seat a lens carrier, and the slots in the bored flange member being traversed by said bore, each pair of said slots being adapted to seat a lens carrier and lens carriers to seat in said slots and each having a bottom margin long enough to span said flange members and fit into a pair of said slots, said carriers each having a pivot opening near said bottom margin to register with said bore when the carrier is fitted into a bored slot, and a common pivot rod removably fitted into said bore and through the pivot openings in all lens carriers, whereby the latter can pivot into operative position to span said flange members with a portion of their respective bottom margins seating in the slot complementary to the slot in which they are pivoted.

9. In an optical system including a plurality of optical elements serially aligned along an optical axis, mounting means including a frame structure for each optical element, said frames each having a marginal region with a pair of spaced losses both projecting from opposite sides of the frame in a general direction of parallelism with the optical axis, one boss of each pair serving as a pivot boss, and the remaining boss of each pair serving as a holding boss, and a bed for said frames and including along one side thereof a series of openings spaced apart in a general direction of parallelism with said optical axis, said openings each being of predetermined width and depth to admit the boss at one side of one of said frames, pintle means in said bed and extending through said openings and bosses lodged therein for pivotally attaching said frames to the bed to rock in a plane transverse to said optical axis from positions of alignment with said axis to positions at one lateral side thereof, and slot means in said bed at a side thereof opposite from the pivotal attachment and boss of each said frame to receive the remaining holding boss in a snug frictional fit for holding the frames in position in the bed.

10. A mounting for seating a plurality of lens elements seriatim in alignment with an optical axis, said mounting comprising: a pair of rigid rods and means supporting the same in fixed parallel relation to each other and to said optical axis; a plurality of lens elements each mounted in a carrier, each said carrier having a bottom edge portion spanning the distance between said rods; said rods each having a series of slots respectively aligning with the slots in the other, such that each rod affords one slot of a pair of transversely aligned carrier-seating slots; said bottom edge portions of the carriers each seating in one of said pairs of slots for alignment in said optical axis; each carrier being pivoted in one slot only of its seating pair, and having a snug fit with the remaining slot of its said pair sufficient to secure the carrier firmly but releasably in aligned position across the optical axis, said carriers each being pivotable out of seated condition as aforesaid for lateral displacement of the appertaining lens element from its condition of alignment with said axis.

References Cited in the file of this patent

UNITED STATES PATENTS

| Number | Name | Date |
|---|---|---|
| 761,390 | Nehring | May 31, 1904 |
| 953,879 | Williams | Apr. 5, 1910 |
| 1,282,293 | Roebuck | Oct. 22, 1918 |
| 1,365,752 | Vischer | Jan. 18, 1921 |
| 1,723,701 | McNabb | Aug. 6, 1929 |
| 1,822,551 | Tondreau | Sept. 8, 1931 |
| 1,932,204 | Dina | Oct. 24, 1933 |
| 2,169,010 | Teague et al. | Aug. 8, 1939 |
| 2,231,743 | Young et al. | Feb. 11, 1941 |
| 2,292,966 | Osterberg et al. | Aug. 11, 1942 |

FOREIGN PATENTS

| Number | Country | Date |
|---|---|---|
| 506,757 | Great Britain | June 5, 1939 |